United States Patent
Takahashi et al.

(10) Patent No.: US 6,345,365 B1
(45) Date of Patent: Feb. 5, 2002

(54) SEMICONDUCTOR DEVICE WITH AN EXTERNAL DELAY CIRCUIT THAT DELAYS AN INTERNAL CLOCK

(75) Inventors: Hiroki Takahashi; Kazuo Nakamura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/247,508

(22) Filed: Feb. 10, 1999

(30) Foreign Application Priority Data

Oct. 9, 1998 (JP) .......................................... P10-287680

(51) Int. Cl.[7] .............................................. G06F 1/04
(52) U.S. Cl. ........................ 713/401; 713/503; 713/600
(58) Field of Search .................................. 713/400, 401, 713/500, 503, 600

(56) References Cited

U.S. PATENT DOCUMENTS 6,269,451 B1 * 7/2001 Mullarkey ................... 713/400
6,281,733 B1 * 8/2001 Miura et al. ................. 327/299

FOREIGN PATENT DOCUMENTS

JP           1-265351        10/1989

\* cited by examiner

*Primary Examiner*—Dennis M. Butler
(74) *Attorney, Agent, or Firm*—Burns, Doane, Swecker & Mathis, LLP

(57) ABSTRACT

A CPU (1) outputs a data signal (DI) in synchronization with an internal clock signal (Iclk). A device (101), which is an integrated circuit, is connected with a delay circuit (10) which is placed outside the device (101). The delay circuit (10) delays the internal clock signal (Iclk) for a delay time shorter than one cycle thereof, and thereby supplies the delayed signal as a delay clock signal (Dclk) to the device (101). A data transfer control circuit (2) delays the data signal (DI) for the delay time of the delay clock signal (Dclk) according to the delay clock signal (Dclk) and a control signal (CS) outputted by the CPU (1), and outputs the delayed data signal as a data signal (DE) to an external device. Since the external device operates in accordance with a control signal (WR) outputted synchronously with the internal clock signal (Iclk), a hold time corresponding to the delay time can be ensured. Thus, an external device, which requires a long hold time, is connectable with the device (101).

12 Claims, 10 Drawing Sheets

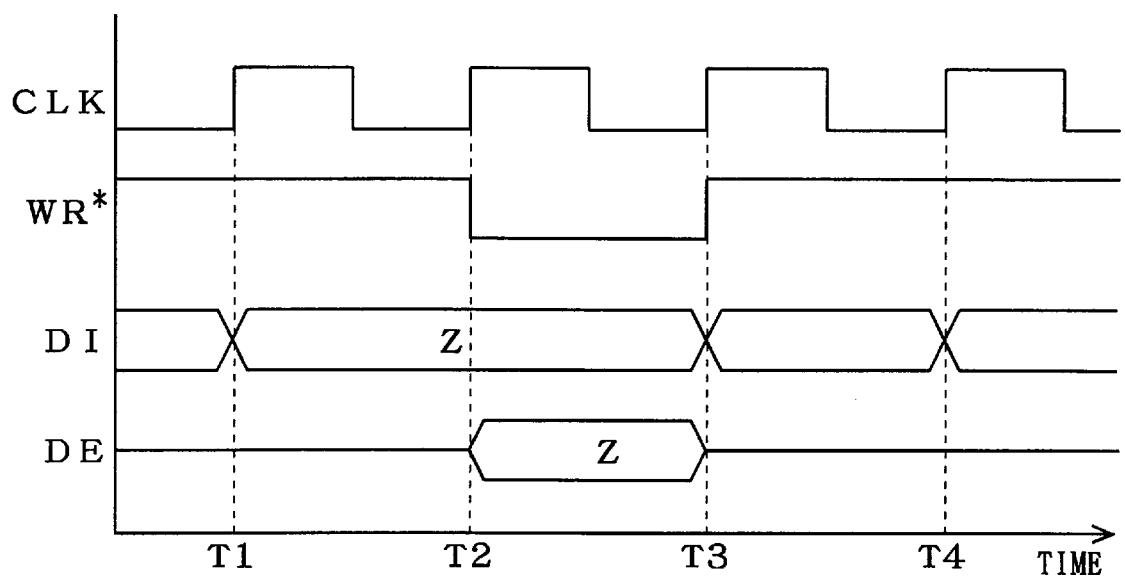
F I G. 2 0

SEMICONDUCTOR DEVICE WITH AN EXTERNAL DELAY CIRCUIT THAT DELAYS AN INTERNAL CLOCK

BACKGROUND OF THE INVENTION

1. Field of the Invention

The present invention relates to a semiconductor device having a central processing unit (CPU); in particular, relates to an improvement thereof to ensure a hold time for a data signal.

2. Description of the Background Art

FIG. 19 is a block diagram showing a structure of a conventional semiconductor device as a background of the present invention. This conventional device 150 is formed as a microprocessor (MPU) comprising a CPU 91 or as a microcomputer (MCU) further comprising a peripheral circuit not shown in FIG. 19 in addition to the CPU 91.

The device 150 comprises a tri-state buffer 92 as well as the CPU 91. A data signal DI outputted by the CPU 91 is inputted to the tri-state buffer 92. The tri-state buffer 92 passes the data signal DI therethrough and outputs the same as a data signal DE when the control signal WR* is active (i.e. at an active level). Hereinafter, an expression "X*" represents that a signal X is low-active, i.e. active at low level. The tri-state buffer 92 sets the output thereof in high-impedance (electrically disconnected) state irrespective of the data signal DI when the control signal WR* is normal. Thus, the tri-state buffer 92 adjusts a timing of the output of the data signal DE transferred from the device 150 to an external device such as a memory device, according to the control signal WR* from the CPU 91.

The CPU 91 operates in synchronization with a clock signal CLK. The control signal WR*, therefore, undergoes transition between an active and a normal levels, being synchronized with the clock signal CLK. Accordingly, the data signal DE is outputted from the device 150 to the external device synchronously with the clock signal CLK. FIG. 20 is a timing diagram illustrating this operation.

The clock signal CLK rises up at respective times T1 to T4. The data signal having a value "Z" is outputted from the CPU 91 during two cycles of the clock signal CLK from the time T1 to T3. During this period, the control signal WR* changes from a normal level to an active level at the time T2 when the clock signal CLK rises up, and returns to the normal level at the time T3 when the clock signal CLK rises up next. As a result, the value "Z" is outputted as the data signal DE from the time T2 to T3.

Thus, the output of the value "Z" in the data signal DE starts and ends in synchronization with the clock signal CLK. On the other hand, since the external device such as a memory device receiving the data signal DE also operates synchronously with the control signal WR*, it is disadvantageously hard to use an external device to be connected with the device 150 which requires a sufficiently long hold time for the data signal DE.

The following documents are known to disclose techniques merely relating to the control of a clock signal: Japanese Patent Laying Open Gazette No. 1-265351, No. 8-123717, No. 2-100750, No. 9-319704, No. 8-6896, No. 6-291615, No. 9-128333, No. 5-257886, No. 62-281047, No. 4-294442, No. 2-171907, and No. 4-370862.

SUMMARY OF THE INVENTION

A first aspect of the present invention is directed to a semiconductor device. The semiconductor device comprises: a CPU operating in synchronization with an internal clock signal; a terminal, being exposed outside said semiconductor device so as to be connectable with a delay circuit which delays said internal clock signal for a predetermined delay time and thereby outputs a delayed signal as a delay clock signal, for receiving said delay clock; and a data transfer control circuit for relaying a data signal transferred between said CPU and an external device with a delay for said delay time according to said delay clock signal supplied through said terminal.

According to a second aspect of the present invention, in the semiconductor device of the first aspect, the data transfer control circuit comprises: a data hold circuit for holding the data signal, which is inputted to the data transfer control circuit, in synchronization with the delay clock signal; a buffer control circuit for outputting a first control signal, being active during a period delayed for the delay time behind a period during which the data signal is inputted, according to a second control signal, which the CPU outputs in synchronization with the internal clock to inform the buffer control circuit that a transfer of the data signal is started and ended, and to the delay clock signal; and a tri-state buffer for outputting the data signal held by the data hold circuit to an outside of the data transfer control circuit only when the first control signal is active.

According to a third aspect of the present invention, in the semiconductor device of the second aspect, the data transfer control circuit further comprises a selection circuit, interposed between the buffer control circuit and the tri-state buffer, for selectively transferring either the first control signal or a third control signal which the CPU outputs to inform the external device that the data signal is transferred, to the tri-state buffer according to a selection signal.

According to a fourth aspect of the present invention, in the semiconductor device of the first or second aspect, the semiconductor device further comprises a tri-state buffer for relaying another data signal transferred between the CPU and another external device, and the tri-state buffer passes the another data signal therethrough only when a control signal, which the CPU outputs to inform the another external device that the another data signal is transferred, is active.

According to a fifth aspect of the present invention, in the semiconductor device of any one of the first to fourth aspects, the semiconductor device further comprises the delay circuit, the delay circuit is connected with the terminal, and the delay time is set shorter than one cycle of the internal clock.

In the device of the first aspect, since the data transfer control circuit relays a data signal transferred between the CPU and the external device with a delay, a hold time can be ensured for the data signal. Moreover, it is possible to set the delay time variously depending on the condition under which the semiconductor device is used after the semiconductor device is completed as a product because the terminal exposed outside is connectable with the delay circuit.

In the device of the second aspect, the data transfer control circuit is most simply formed of the data hold circuit, the tri-state buffer and the buffer control circuit.

In the device of the third aspect, since the tri-state buffer is selectively controlled by either of the two control signals through the selection circuit, it is possible to select a hold time depending on the characteristics of the connected external device.

In the device of the fourth aspect, since the two paths having different hold times are provided for transferring the data signals, external devices having different characteristics in relation to the hold time are connectable even simultaneously.

In the device of the fourth aspect, since the delay circuit is already provided, a user can use the device without attaching a delay circuit. Moreover, since the delay time is set shorter than one cycle of the internal clock signal, there is no apprehension that an erroneous data signal is transferred between the CPU and the external device.

Accordingly, it is an object of the present invention to obtain a semiconductor device capable of ensuring the hold time sufficiently long for the data signal transferred between the CPU and the external device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a timing diagram of the device shown in FIG. 19.

DESCRIPTION OF THE PREFERRED EMBODIMENTS

<1. First Preferred Embodiment>

First, a semiconductor device according to a first preferred embodiment of the present invention will be described.

<1-1. Outline of Device>

Figure 1:
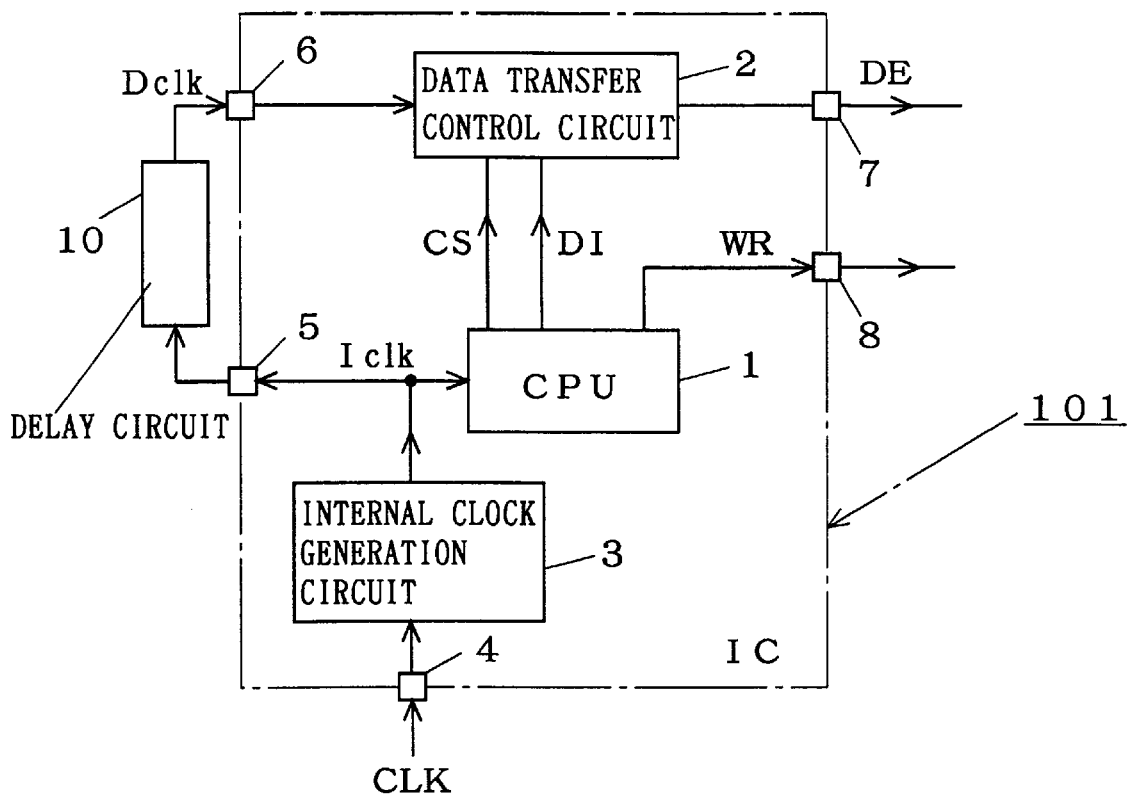
FIG. 1 is a block diagram showing a device according to a first preferred embodiment of the present invention.

FIG. 1 is a block diagram showing a structure of the semiconductor device of the first preferred embodiment. This device 101, which is an integrated circuit (IC), is formed as an MCU or an MPU comprising a CPU 1, a data transfer control circuit 2 and an internal clock generation circuit 3. The CPU 1 executes a processing on the basis of a program supplied from an external memory device for example.

The device 101 further comprises terminals 4 to 8. Although the device 101 is preferably sealed in with a resin or the like, the terminals 4 to 8 are exposed outside the device 101. Accordingly, the terminals 4 to 8 are connectable with external devices by soldering for example, after the device 101 is completed as a product. The external devices may be connected with the terminals 4 to 8 indirectly e.g. through wirings disposed on a circuit board, as well as directly.

A clock signal CLK is supplied through the terminal 4 from the outside of the device 101. The clock CLK is converted into an internal clock signal Iclk by the internal clock generation circuit 3. The clock signal CLK is, for example, a clock source oscillation signal supplied from an oscillator. The internal clock generation circuit 3, for example, performs waveform shaping and frequency-division for the clock signal CLK to thereby generate the internal clock signal Iclk.

The internal clock signal Iclk is supplied to the CPU 1. The CPU 1 operates in synchronization with the internal clock signal Iclk. The CPU 1, therefore, starts and ends outputting the data signal DI to an external device such as a memory device synchronously with the internal clock signal Iclk. The CPU 1 outputs a control signal WR and a control signal CS as well as the data signal DI. The control signal CS includes plural control signals, for example, as will be described later. The output of these control signals WR and CS are also started and ended in synchronization with the internal clock signal Iclk. The control signal WR informs the external device, which receives the data signal DI, of the data signal DI being outputted; i.e. it is a write-enable signal. The control signal CS controls the data transfer control circuit 2.

The internal clock signal Iclk is also transferred to an external delay circuit 10 through the terminal 5. The delay circuit 10 delays the internal clock signal Iclk, thereby generates a delay clock signal Dclk, and supplies the same to the data transfer control circuit 2 through the terminal 6. The delay circuit 10, which is one of the external devices, is connected with the terminals 5 and 6 by soldering for example, after the device 101 is completed as a product.

It is also possible to form another semiconductor device which comprises not only the device 101, which is a semiconductor integrated circuit, as a principal circuit component but also the delay circuit 10 connected with the terminals 5 and 6. Such a device is usually implemented by a user of the device 101 completed as a product carrying out an assembling work to dispose both the device 101 and the delay circuit 10 onto a circuit board.

The data transfer control circuit 2 delays and relays the data signal DI transferred from the CPU 1 to the external device, according to the control signal CS outputted from the CPU 1 and the delay clock signal Dclk outputted from the delay circuit 10. The data transfer control circuit 2, dissimilarly to the CPU 1, operates in synchronization not with the internal clock signal Iclk but with the delay clock signal Dclk. The data signal DI is, thereby, transferred to the outside as the data signal DE in synchronization with the delay clock signal Dclk which is delayed behind the internal clock signal Iclk. The data signal DE and the control signal WR are outputted to the outside through the terminals 7 and 8, respectively.

Figure 2:
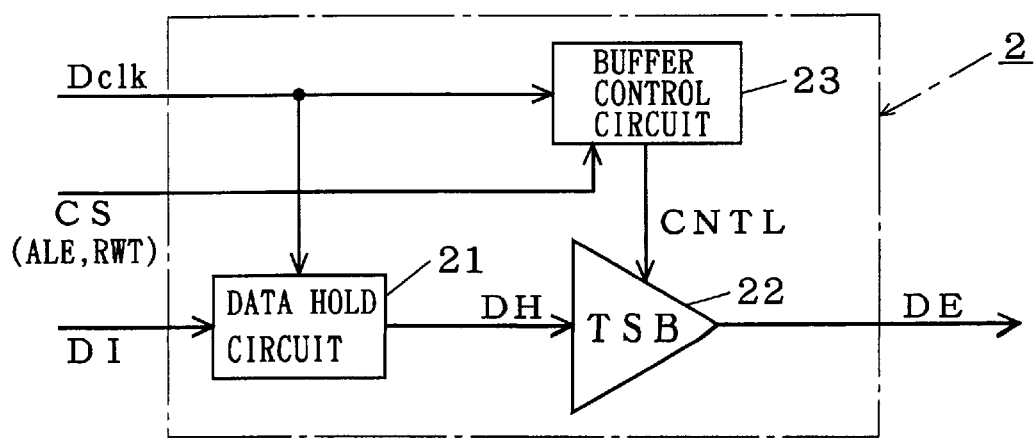
FIG. 2 is an internal block diagram of the data transfer control circuit shown in FIG. 1.

FIG. 2 is a block diagram showing an internal structure of the data transfer control circuit 2. The data transfer control circuit 2 comprises a data hold circuit 21, a tri-state buffer 22 and a buffer control circuit 23. The data hold circuit 21, which is a latch circuit for example, holds the data signal DI in synchronization with the delay clock signal Dclk and outputs the held signal as a data signal DH.

The tri-state buffer 22 controls the output of the data signal DE according to a control signal CNTL outputted by the buffer control circuit 23. More specifically, the tri-state buffer 22 outputs the data signal DH as it is or after amplifying the same as the data signal DE when the control signal CNTL is active, and sets the output in high-impedance state to thereby disconnect the CPU 1 from the transfer path of the data signal DE to the external device when the control signal CNTL is normal. The buffer control circuit 23 generates the control signal CNTL in accordance with the delay clock signal Dclk and the control signal CS, and transfers the same to the tri-state buffer 22.

Figure 3:
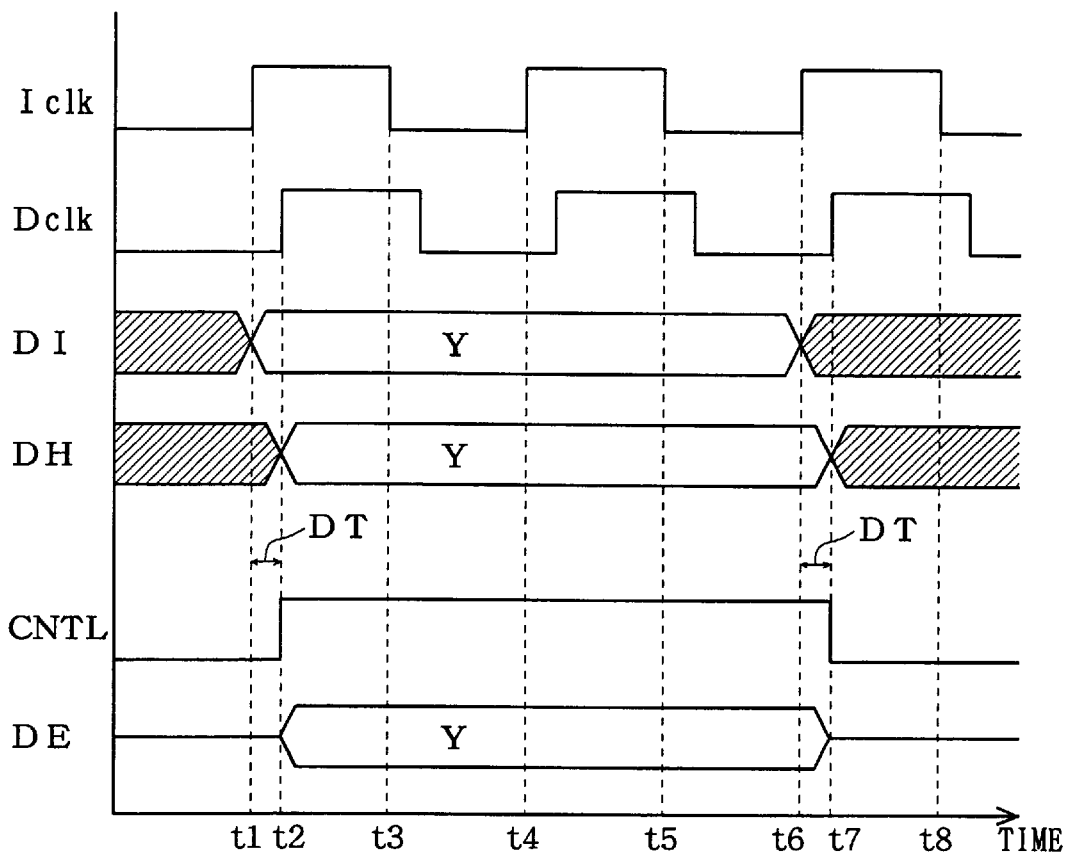
FIG. 3 is a timing diagram of the data transfer control circuit shown in FIG. 2.

FIG. 3 is a timing diagram explaining an operation of the data transfer control circuit 2. The CPU 1 starts outputting a value "Y" as the data signal DI at a time t1 when the internal clock signal Iclk rises up, and ends the same at a time T6 when the internal clock signal Iclk rises up two cycles after the time t1. The delay clock signal Dclk is delayed for a delay time DT behind the internal clock signal Iclk. Therefore, the data hold circuit 21, which operates synchronously with the delay clock signal Dclk, outputs the data signal DH the delay time DT later than the data signal DI is inputted.

The buffer control circuit 23 sets the control signal CNTL active during a period the delay time DT later than a period during which the CPU 1 outputs the data signal DI; i.e. the control signal WR is active. The tri-state buffer 22, therefore, outputs the value "Y" as the data signal DE delaying the same for the delay time DT behind the data signal DI.

Thus, the data signal DI, which the CPU 1 originally outputs, is outputted as the data signal DE from the data transfer control circuit 2 to the outside with a delay for the delay time DT. Since the external device such as a memory device receiving the data signal DE operates synchronously with the control signal WR, a hold time corresponding to the delay time DT is ensured. It is, therefore, possible to use an external device requiring a sufficiently long hold time for the data signal DE, connecting the same with the device 101.

In particular, the external devices such as memory devices are, in many cases, slower in operation speed than the CPU 1. Therefore, the external devices need a sufficiently long hold time when receiving the data signal DE outputted by the device 101 to read, as is not a rare case. The device 101 readily meets such a requirement which an MCU or an MPU comprising the CPU 1 often faces.

The external device requiring a longer hold time is connectable with the device 101, as the delay time DT increases. However, if the delay time DT is longer than one cycle of the internal clock signal Iclk, in some case, an erroneous value subsequent to the value "Y," for example, is outputted as the data signal DE. For this reason, the delay time DT is set shorter than one cycle of the internal clock Iclk.

Since the delay circuit 10 is connectable as an external device after the device 101 is completed as a product, as described above, it is possible to implement various hold times for the same device 101 by connecting the delay circuits 10 having various delay times DT. Thus, it is possible to set the hold time freely depending on the purpose of use of the device 101 and the characteristics of the external device to be connected.

<1-2. Buffer Control Circuit>

Figure 4:
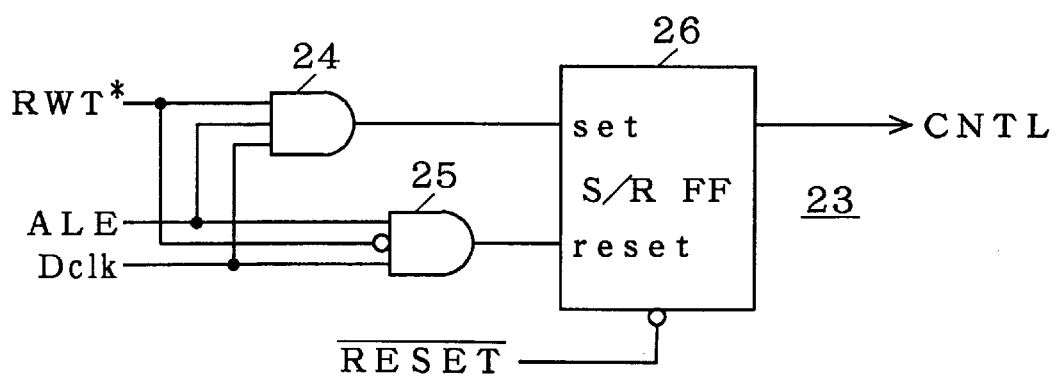
FIG. 4 is a circuit diagram of the buffer control circuit shown in FIG. 2.

FIG. 4 is a circuit diagram illustrating an exemplary internal structure of the buffer control circuit 23. The buffer control circuit 23, in this example, comprises logical AND circuits 24, 25 and an S/R flip-flop 26. The control signal CS outputted by the CPU 1 includes control signals RWT* and ALE. Each of the logical AND circuits 24 and 25 receives control signals RWT* and ALE and the delay clock signal Dclk. The control signal RWT* is inputted to one of the logical AND circuits 24 and 25 after being inverted.

The outputs of the logical AND circuits 24 and 25 are respectively connected with a set input and a reset input of the S/R flip-flop 26. As a result, the S/R flip-flop 26 outputs the control signal CNTL. Further, the S/R flip-flop 26 restores the control signal CNTL, which is an output signal thereof, to the initial value in response to a reset signal RESET* which is inputted when the CPU 1 is reset for example.

Figure 5:
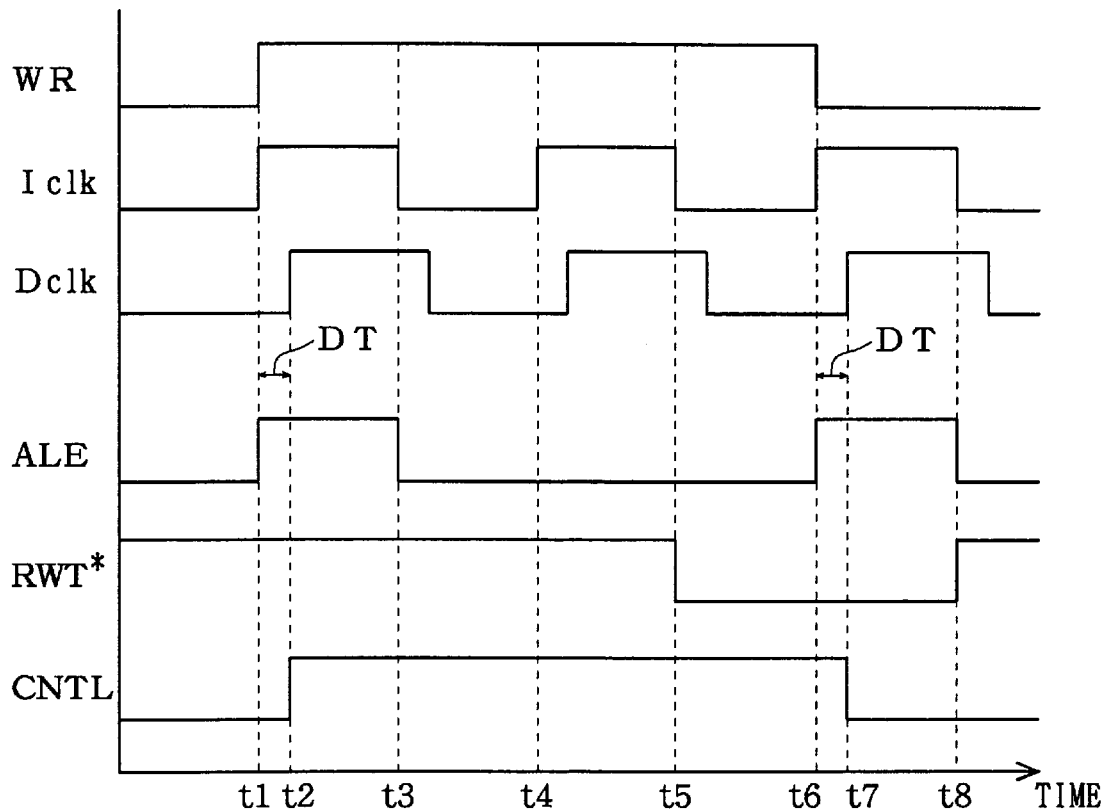
FIG. 5 is a timing diagram of the buffer control circuit shown in FIG. 4.

FIG. 5 is a timing diagram explaining an operation of the buffer control circuit 23 illustrated in FIG. 4. The operation of the CPU 1 from the time t1 to t8 is the same between FIG. 3 and FIG. 5. The CPU 1 activates the control signal WR during a period when the value "Y" is outputted as the data signal DI, i.e. from the time t1 to t6.

The CPU 1 further activates the control signal ALE for informing the buffer control circuit 23 that is starts and ends outputting the data signal DI, from the time t1 to a time t3 and from the time t6 to a time t8. The internal clock signal Iclk falls down first after the time t1 at the time t3, and first after the time t6 at the time t8.

The CPU 1, moreover, activates the control signal RWT* for informing the buffer control circuit 23 that it ends outputting the data signal DI, from a time t5 at which the internal clock signal Iclk falls down immediately before the time t6, to the time t8 at which the internal clock signal Iclk falls down first after the time t5. Thus, the control signal CS, which includes the control signals ALE and RWT*, is equivalent to a 2-bit signal for informing the buffer control circuit 23 that the output of the data signal DI is started and ended.

The logical AND circuit 24 transfers the delay clock signal Dclk to the set input of the S/R flip-flop 26 only during a period when the control signal RWT* is normal and the control signal ALE is active, i.e. from the time t1 to t3. On the other hand, the logical AND circuit 25 transfers the delay clock signal Dclk to the reset input of the S/R flip-flop 26 only during a period when both the control signals RWT* and ALE are active, i.e. from the time t6 to t8.

The S/R flip-flop 26, therefore, is set at a time t2 when the delay clock signal Dclk rises up within a period from the time t1 to t3, and reset at a time t7 when it rises up within a period from the time t6 to t8. As a result, the control signal CNTL is activated during a period from the time t2 to t7 which is the delay time DT later than a period from the time t1 to t6 during which the data signal DI is outputted.

Figure 6:
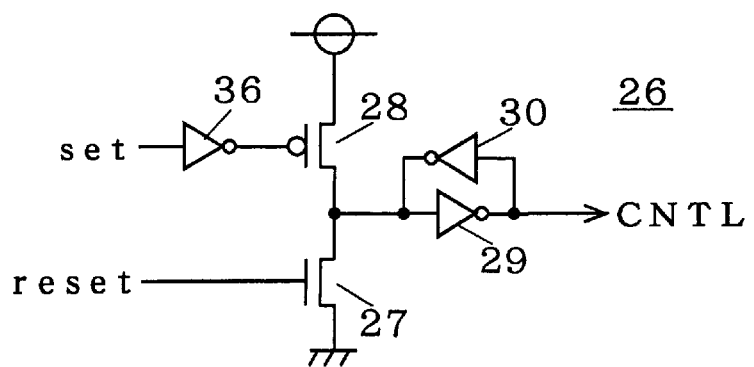
FIG. 6 is a circuit diagram of the S/R flip-flop shown in FIG. 4.

FIG. 6 is a circuit diagram illustrating an exemplary internal structure of the S/R flip-flop 26. The S/R flip-flop 26, in this example, comprises an inverter 36, MOSFETs 27, 28, and inverters 29, 30. The n-channel MOSFET 27 and the p-channel MOSFET 28 are connected in series with each other, and interposed between a positive potential source line and a ground potential source line to thereby form an inverter. The gate electrode of the MOSFET 27 and the input of the inverter 36, the output of which is connected with the gate electrode of the MOSFET 28, respectively correspond to the set input and the reset input of the S/R flip-flop 26.

The output of the inverter formed of the MOSFET 27 and 28 is connected with the input of the inverter 29. The output of the inverter 29 is positively fed back to the input thereof through the inverter 30. Current drive capacity is set higher in the inverter 29 than in the inverter 30.

Since the S/R flip-flop 26 is formed as described above, the control signal CNTL changes to active and normal levels in response to an active signal inputted to the set input and the reset input, respectively. The control signal CNTL does not change its value when a normal signal is inputted to the set and reset inputs.

<1-3. Data Hold Circuit and Delay Circuit>

Figure 7:
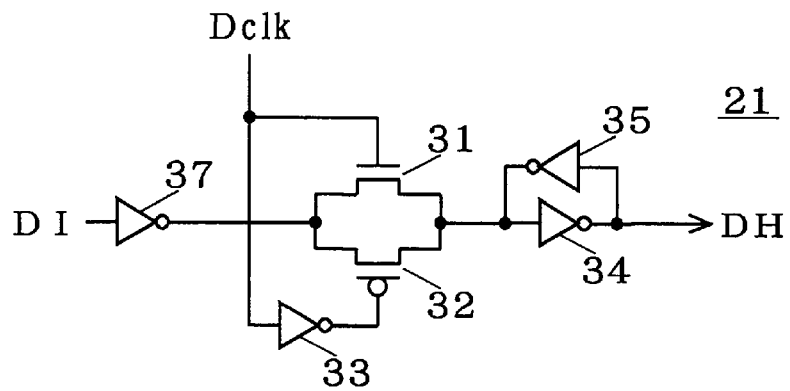
FIG. 7 is a circuit diagram of the data hold circuit shown in FIG. 2.

FIG. 7 is a circuit diagram illustrating an exemplary internal structure of the data hold circuit 21. The data hold circuit 21, in this example, comprises inverters 33, 37, MOSFETs 31, 32, and inverters 34, 35. The MOSFETs 31 and 32, which respectively form transfer gate elements, transfer the inverted signal of the data signal DI inputted through the inverter 37, to the inverter 34 only when the delay clock signal Dclk inputted directly or through the inverter 33 to the gate electrodes is active. The output of the inverter 34 is positively fed back to the input thereof through the inverter 35. The current drive capacity is set higher in the inverter 34 than in the inverter 35.

The data hold circuit 21 is formed as described above; therefore, it outputs the data signal DI as the data signal DH when the delay clock signal Dclk is active. The data hold circuit 21, on the contrary, holds the data signal DI directly before the transition from an active to a normal level to thereby output the same continuously as the data signal DH when the clock signal Dclk is normal. Thus, the data transfer control circuit 2 can readily be formed of simple circuits.

Figure 8:
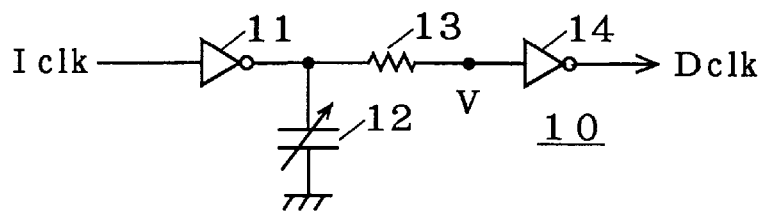
FIG. 8 is a circuit diagram of the delay circuit shown in FIG. 1.

FIG. 8 is a circuit diagram illustrating an exemplary internal structure of the delay circuit 10. In this example, a first-degree low-pass filter, which comprises a capacitor 12 and a resistor 13, is interposed between the output of the inverter 11 receiving the internal clock signal Iclk at the input thereof and the input of the inverter 14 outputting the delay clock signal Dclk from the output thereof.

Figure 9:
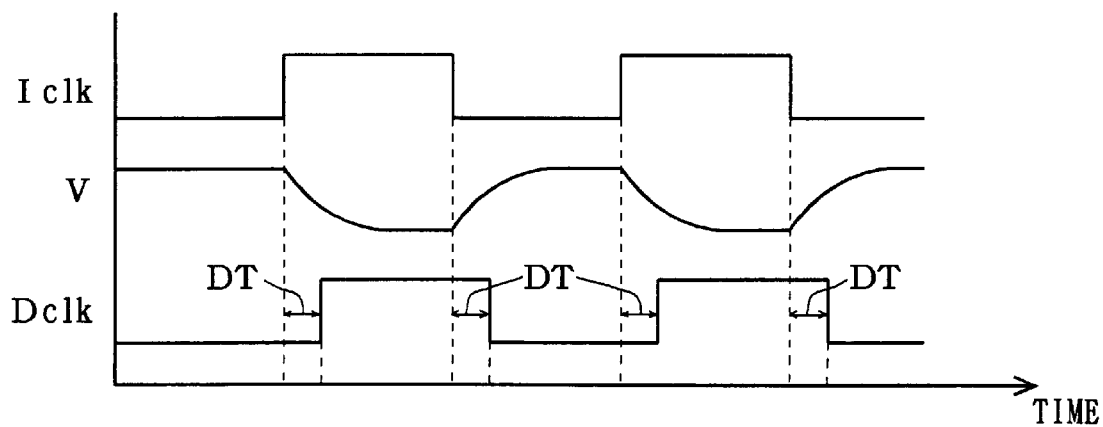
FIG. 9 is a timing diagram of the delay circuit shown in FIG. 8.

FIG. 9 is a timing diagram explaining an operation of the delay circuit 10 illustrated in FIG. 8. A voltage signal V inputted from the low-pass filter to the inverter 14 gradually follows the change in the internal clock Iclk with a time constant defined by the resistance of the resistor 13 and the capacitance of the capacitor 12. The inverter 14, therefore, outputs a signal delayed for the delay time DT defined by the time constant behind the internal clock signal Iclk, as the delay clock signal Dclk.

The delay circuit 10 illustrated in FIG. 9 allows the delay time DT to be changed variously by changing the element constants of the capacitor 12 and the resistor 13. In particular, when the duty ratio of the internal clock signal Iclk is 50%, the delay time DT is variable from 0 to one-half cycle of the internal clock signal Iclk.

<1-4. Other Exemplary Devices>

Although the device 101 (FIG. 1) generates the internal clock signal Iclk in the inside thereof according to the clock signal CLK inputted from the outside, it is also possible to supply the internal clock signal Iclk directly from the outside. In this configuration, the internal clock generation circuit 3 (FIG. 3) can be removed.

Figure 10:
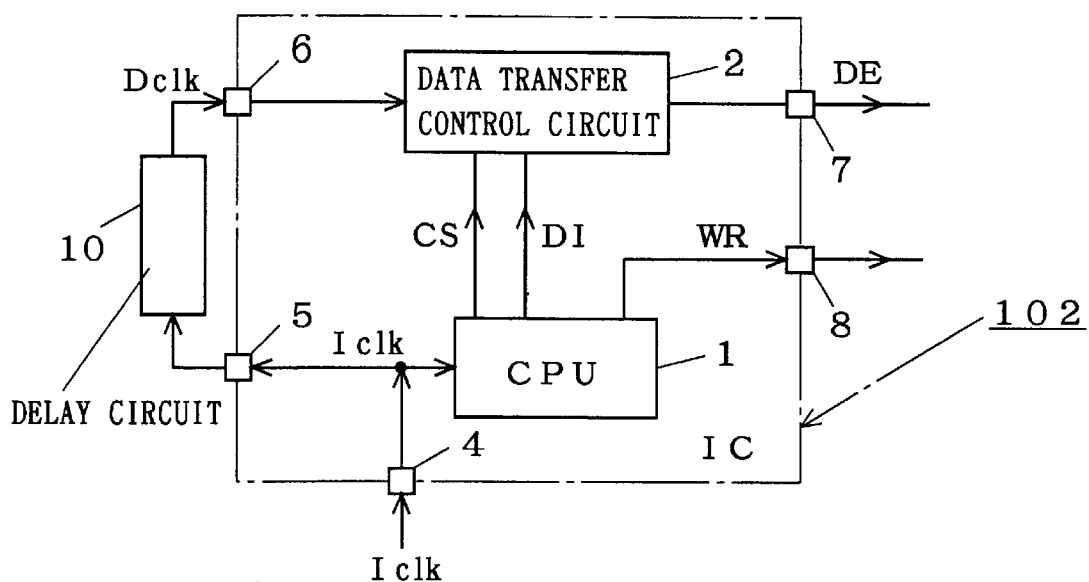
FIG. 10 is a block diagram of another exemplary device of the first preferred embodiment.
Figure 11:
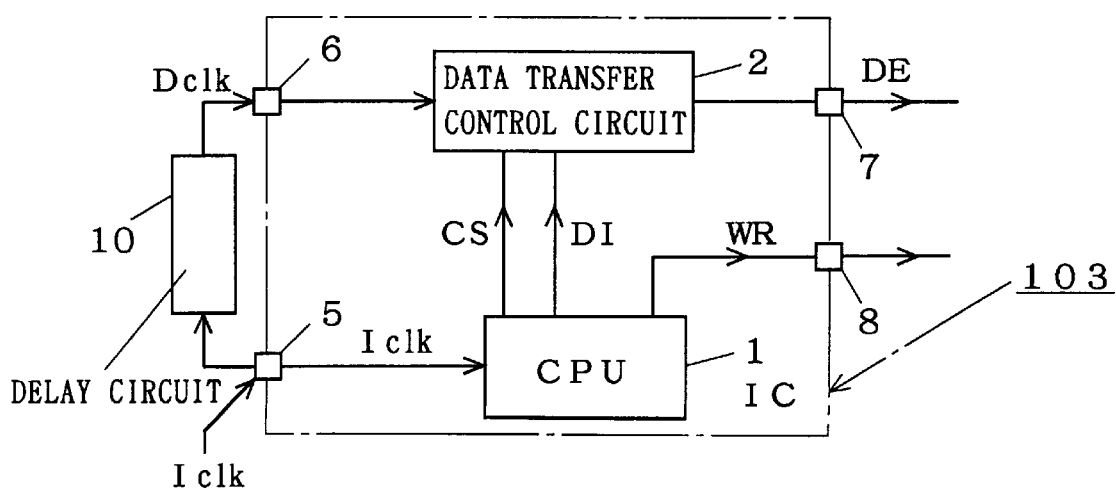
FIG. 11 is a block diagram of still another exemplary device of the first preferred embodiment.

FIGS. 10 and 11 show so formed devices. In the device 102 shown in FIG. 10, the internal clock signal Iclk is inputted from the outside to the terminal 4. The internal clock signal Iclk inputted to the terminal 4 is transferred to both the CPU 1 and the terminal 5. That is, the device 102 further comprises another terminal 4 for receiving the internal clock signal Iclk in addition to the terminal 5 for transferring the internal clock signal Iclk to the delay circuit 10.

On the other hand, in the device 103 shown in FIG. 11, the terminal 4 is not provided, but the internal clock signal Iclk is inputted to the terminal 5. The internal clock signal Iclk inputted to the terminal 5 is transferred to the CPU 1. The internal clock signal Iclk is also supplied to the delay circuit 10 connected with the terminal 5. That is, the two terminals for receiving the internal clock signal Iclk and for transferring the internal clock signal Iclk to the delay circuit 10 are unified into the single terminal 5.

<2. Second Preferred Embodiment>

Figure 12:
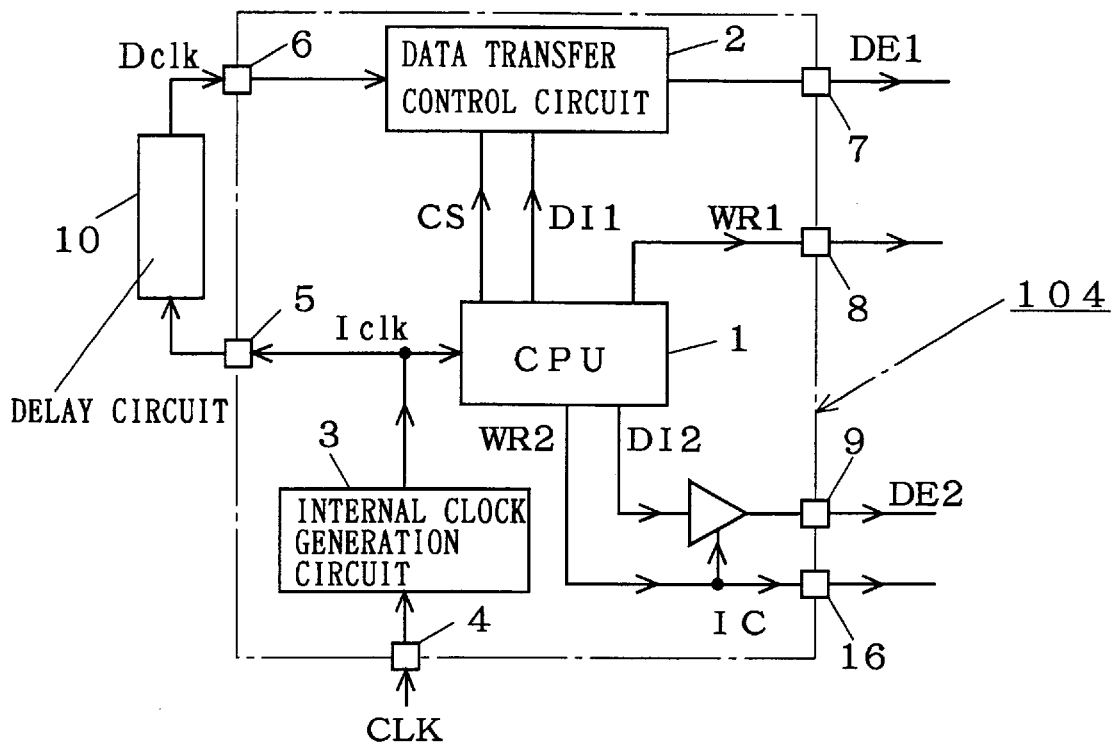
FIG. 12 is a block diagram showing a device according to a second preferred embodiment of the present invention.

FIG. 12 is a block diagram showing a structure of the semiconductor device according to a second preferred embodiment of the present invention. This device 104 is characteristically different from the device 101 (FIG. 1) in that two paths for transferring the data signals i.e. two data buses are provided.

One path for transferring first data signals DI1, DE1 is formed the same as that in the device 101. More specifically, the data signal DI1 outputted from the CPU 1 is transferred through the terminal 7 to the outside as the data signal DE1 synchronized with the delayed clock signal Dclk by the data transfer control circuit 2. The CPU 1 outputs the control signal WR1 for informing an external device which receives the data signal DI1, that it outputs the data signal DI1 to the external device, as well as the data signal DI1 and the control signal CS. The control signal WR1 is outputted to the outside through the terminal 8.

The other path for transferring second data signals DI2, DE2 is formed the same as that in the conventional device 150. More specifically, the data signal DI2 is transferred through a terminal 9 to the outside as the data signal DE2 synchronized with the internal clock signal Iclk by a tri-state buffer 38 which operates in accordance with the control signal WR2 outputted from the CPU 1. The control signal WR2 is a signal for informing an external device, which receives the data signal DI2, of the data signal DI2 being outputted, and is transferred to the external device through a terminal 16.

Therefore, an external device either requiring a long hold time or not is connectable with the device 104; moreover, both the devices are connectable simultaneously. Thus, it is possible to select a data bus to be connected depending on the characteristics of the external devices.

<3. Third Preferred Embodiment>

Figure 13:
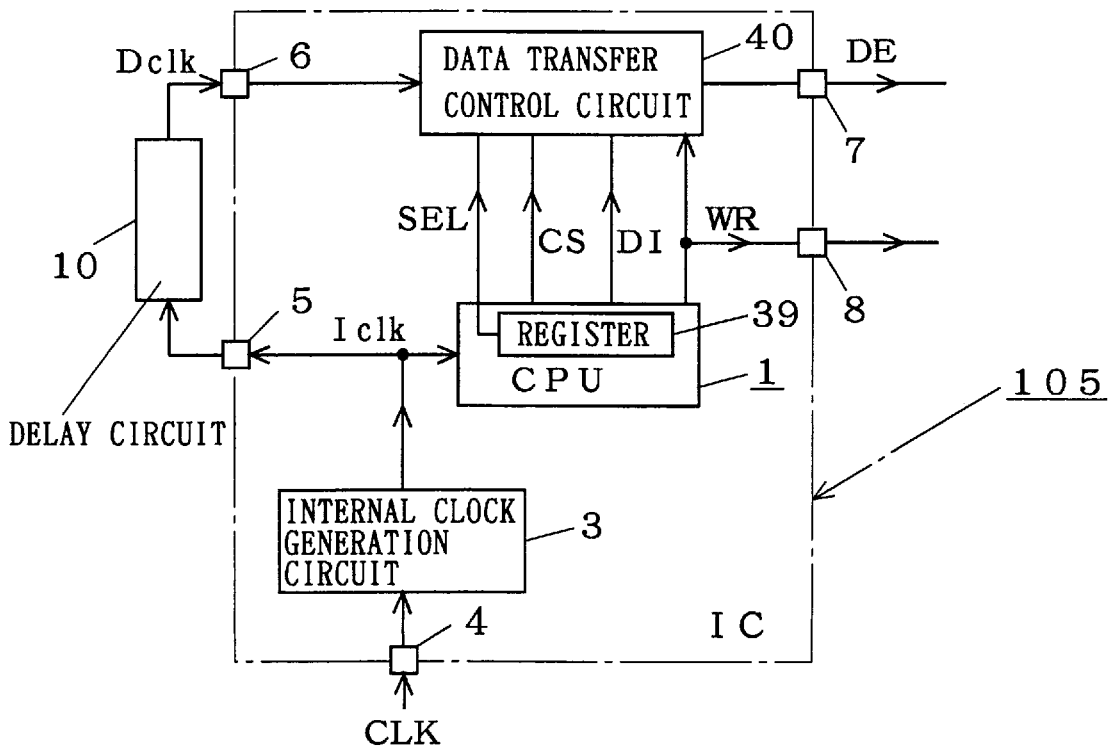
FIG. 13 is a block diagram showing a device according to a third preferred embodiment of the present invention.

FIG. 13 is a block diagram showing a structure of a semiconductor device according to a third preferred embodiment of the present invention. This device 105 is characteristically different from the device 101 (FIG. 1) in that the data transfer control circuit 2 is replaced with a data transfer control circuit 40, and thereby, the data signal DI outputted from the CPU 1 is transferred to the outside as the data signal DE, being optionally synchronized with either the internal clock signal Iclk or the delay clock signal Dclk.

The control signal WR outputted by the CPU 1 is inputted to the data transfer control circuit 40 as well as transferred through the terminal 8 to the outside. The CPU 1, which comprises a register 39, inputs a selection signal SEL held in the register 39 to the data transfer control circuit 40. The data transfer control circuit 40 selects a clock signal, with which the data signal DE is to be synchronized, in accordance with the selection signal SEL.

Figure 14:
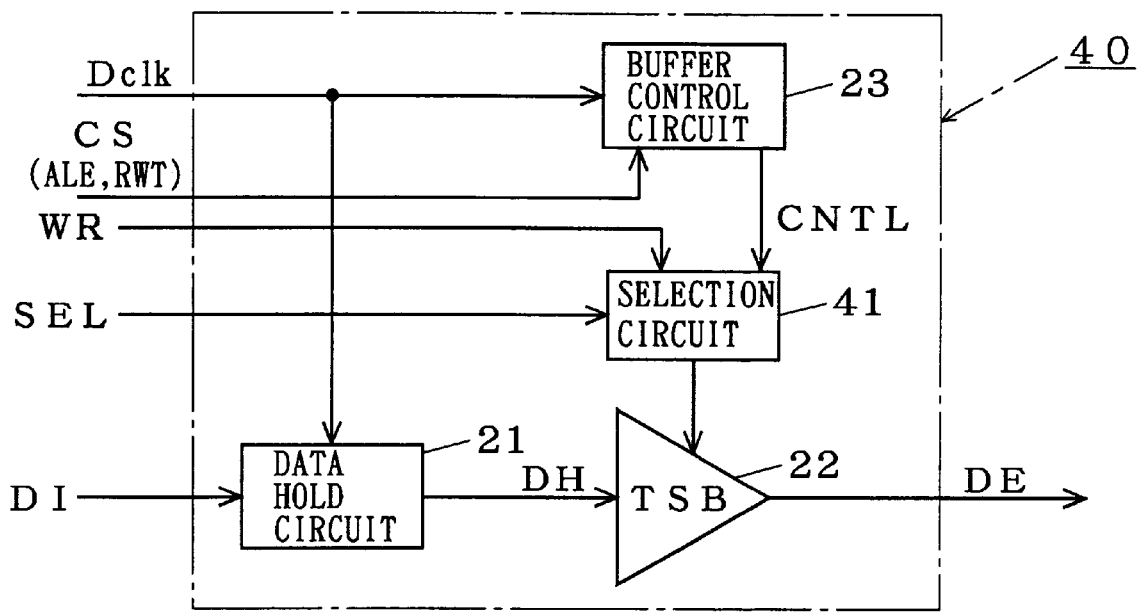
FIG. 14 is an internal block diagram of the data transfer control circuit shown in FIG. 13.

FIG. 14 is a block diagram showing an internal structure of the data transfer control circuit 40. The data transfer control circuit 40 is characteristically different from the data transfer control circuit 2 (FIG. 2) in that a selection circuit 41 is interposed into a path for transferring the control signal CNTL from the buffer control circuit 23 to the tri-state buffer 22. The selection circuit 41 selects either the control signal WR outputted by the CPU 1 or the control signal CNTL outputted by the buffer control circuit 23 according to the selection signal SEL, and transfers the selected signal as a control signal to the tri-state buffer 22.

Figure 19:
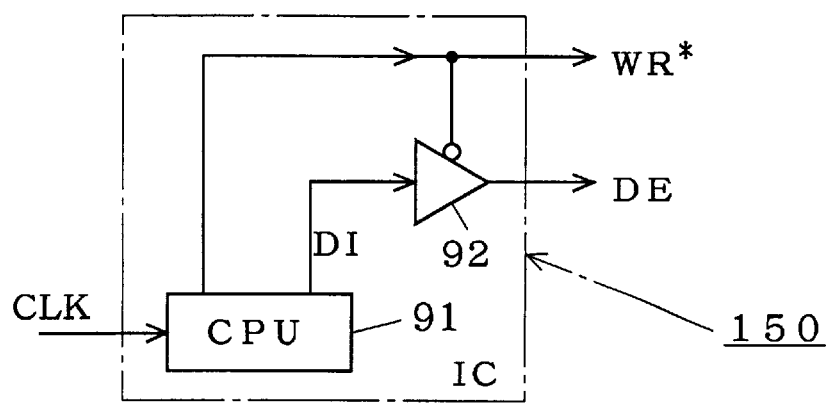
FIG. 19 is a block diagram showing a conventional device.

The tri-state buffer 22, therefore, can selectively be controlled in accordance with the selection signal SEL either by the buffer control circuit 23 operating in synchronization with the delay clock Dclk similarly to the tri-state buffer 22 (FIG. 2) in the device 101, or by the control signal WR synchronized with the internal clock signal Iclk similarly to the tri-state buffer 92 in the conventional device 150 (FIG. 19). Thus, the device 105 operates equivalently to either the device 101 or the conventional device 150 in accordance with the selection signal SEL.

Therefore, an external device either requiring a long hold time or not is connectable with the device 105. Thus, it is possible to select a hold time depending on the characteristics of the external devices.

Figure 15:
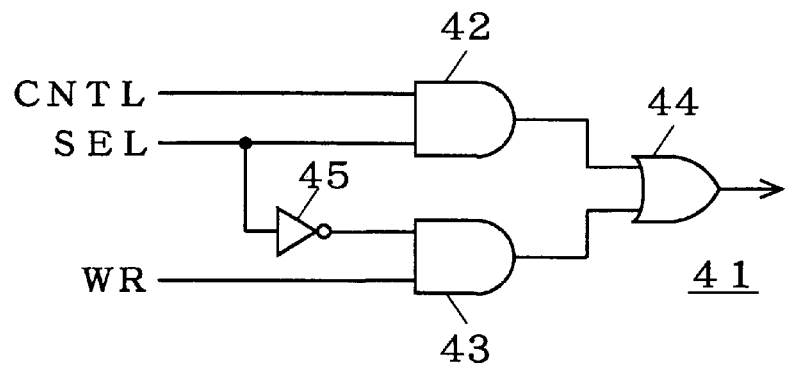
FIG. 15 is a circuit diagram of the selection circuit shown in FIG. 14.

FIG. 15 is a circuit diagram illustrating an exemplary internal structure of the selection circuit 41. The selection circuit 41, in this example, comprises logical AND circuits 42, 43, a logical OR circuit 44, and an inverter 45. The logical AND circuit 42 outputs a logical AND of the control signal CNTL and the selection signal SEL. The logical AND circuit 43 outputs a logical AND of the control signal WR and an inverted signal of the selection signal SEL outputted by the inverter 45.

The logical OR circuit 44 transfers a logical OR of the outputs of the logical AND circuits 42 and 43, as a control signal to the tri-state buffer 22. The logical OR circuit 44, therefore, outputs the control signal CNTL when the selection signal SEL is at a high level, whereas outputs the control signal WR when the selection signal SEL is at a low level.

As described above, a signal temporarily stored in the register 39 (FIG. 13) provided in the CPU 1 is transferred as the selection signal SEL to the data transfer control circuit 40. The selection signal SEL, therefore, can freely be changed by modifying the program defining the operation of the CPU 1.

The device 105 can also be so formed as to allow the selection signal SEL to be inputted directly from the outside to the data transfer control circuit 40 through a terminal exposed to the outside, although not shown in a figure. For this purpose, it is effective to add another terminal to the terminals 4 to 8 in the device 105 and replace the path for transferring the selection signal SEL from the CPU 1 to the data transfer control circuit 40 with another path for transferring the selection signal SEL from the added terminal to the data transfer control circuit 40.

It is also possible to expand the path for transferring the data signals DI and DE i.e. a data bus to plural data buses, and interpose the data transfer control circuit 40 into each of the busses. The hold time, thereby, can be selected individually for respective data buses in accordance with the characteristics of the plural external devices which respectively receive the plural data signals DE transferred through the plural data buses.

<4. Fourth Preferred Embodiment>

Figure 16:
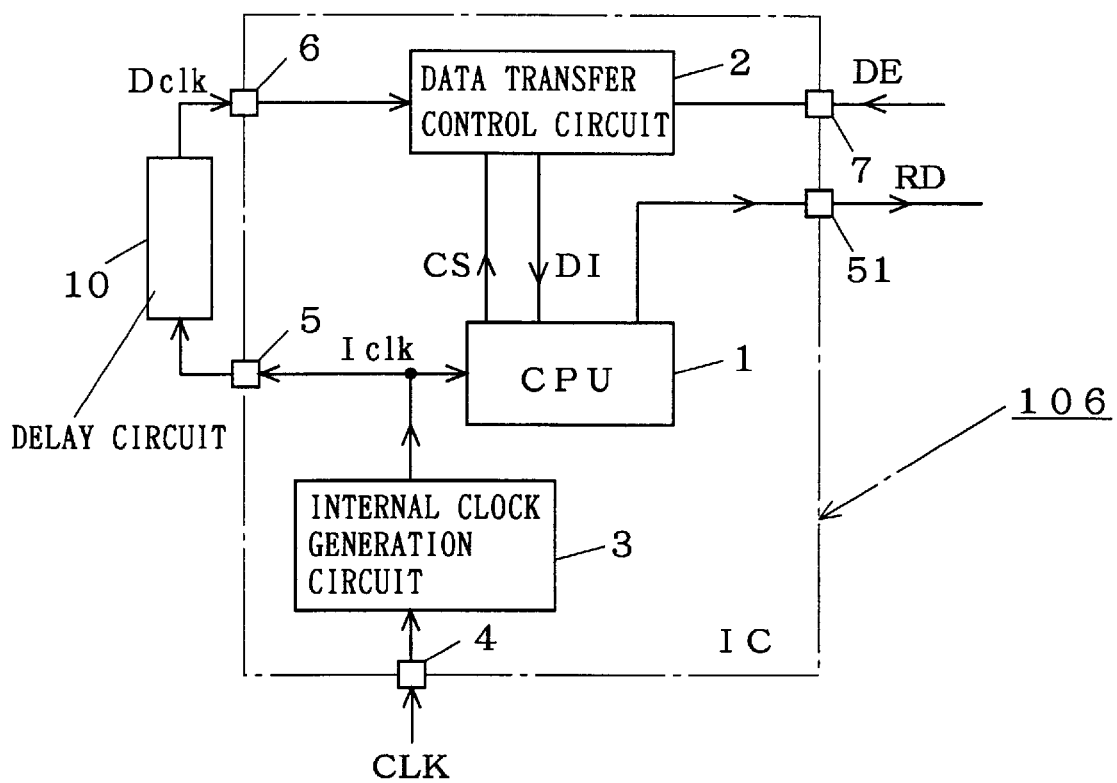
FIG. 16 is a block diagram showing a device according to a fourth preferred embodiment of the pressent invention.

FIG. 16 is a block diagram showing a structure of a semiconductor device according to a fourth preferred embodiment of the present invention. This device 106 is characteristically different from the device 101 (FIG. 1) in that the data transfer control circuit 2 delays and relays the data signals DE, DI transferred from an external device to the CPU 1 i.e. input data signals. Thus, the data transfer control circuit 2 can generally control the transfer of the data signal between the CPU 1 and the external device, i.e. either the input or the output of the data signal.

The CPU 1 outputs a control signal RD for instructing the external device to output the data signal DE, i.e. a read-enable signal. The control signal RD is transferred through a terminal 51 to the external device which outputs the data signal DE. The external device outputs the data signal DE in synchronization with the control signal RD. Since the control signal RD is generated by the CPU 1, it is synchronized with the internal clock signal Iclk. Therefore, the data signal DE is also outputted from the external device synchronously with the internal clock signal Iclk.

Figure 17:
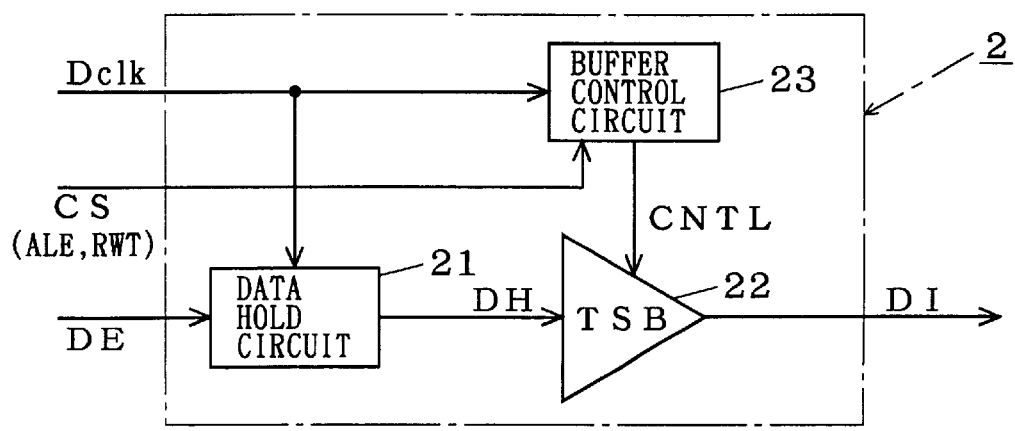
FIG. 17 is an internal block diagram of the data transfer control circuit shown in FIG. 16.

FIG. 17 is a block diagram showing an internal structure of the data transfer control circuit 2. As FIG. 17 shows, the data transfer control circuit 2 in the device 106 is formed the same as the data transfer control circuit 2 in the device 101 shown in FIG. 2. The data signal DE, however, is inputted instead of the data signal DI, and the data signal DI is outputted instead of the data signal DE. Thus, the data signals DI and DE are replaced with each other between the two configurations shown in FIG. 2 and FIG. 17.

Figure 18:
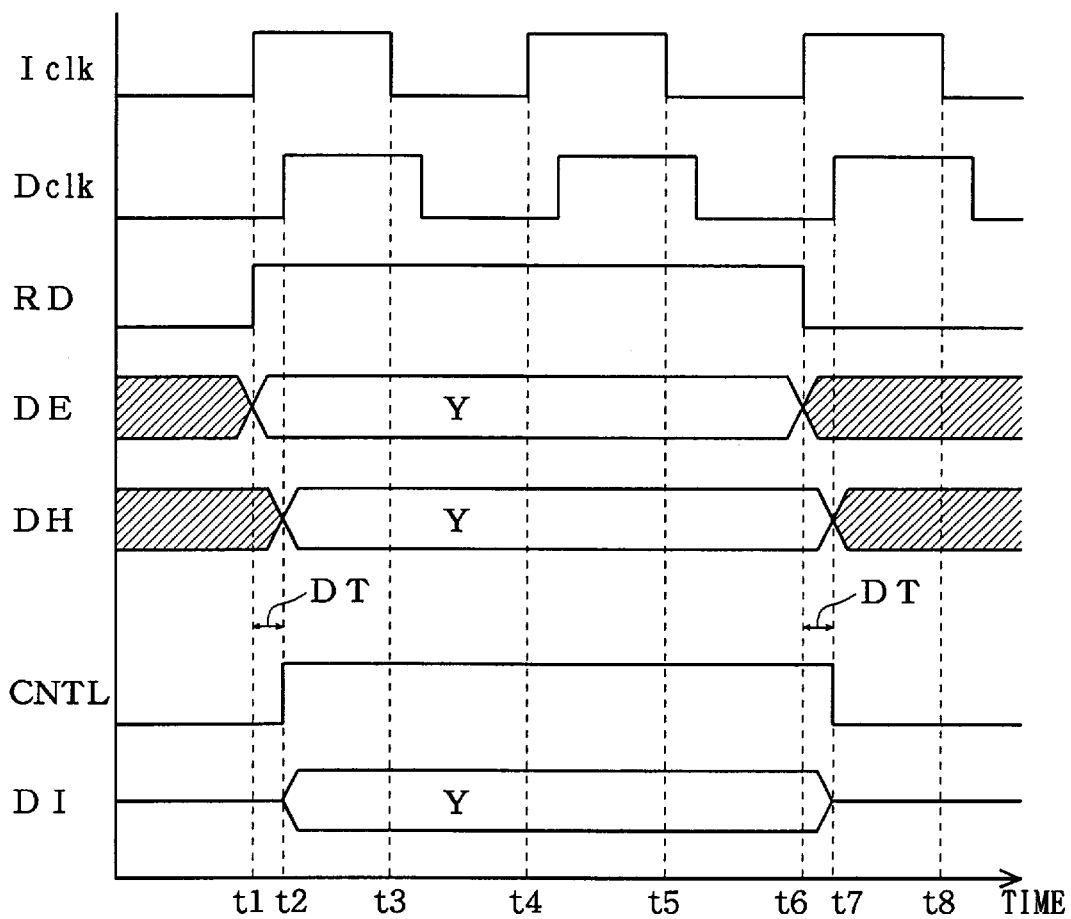
FIG. 18 is a timing diagram of the data transfer control circuit shown in FIG. 17.

FIG. 18 is a timing diagram explaining an operation of the data transfer control circuit 2 shown in FIG. 17. The CPU 1 activates the control signal RD from a time t1 at which the internal clock signal Iclk rises up to a time t6 at which the same rises up two cycles after the time t1. In response thereto, the external device starts outputting a value "Y" as the data signal DI at the time t1, and ends at the time t6. The data hold circuit 21, which operates in synchronization with the delay clock signal Dclk, outputs the data signal DH delaying the same for the delay time DT behind the data signal DI.

The buffer control circuit 23 receives the delay clock signal Dclk and the control signal CS similarly to the buffer control circuit 23 shown in FIG. 2. The control signal CS including the control signals ALE and RWT* is equivalent to a 2-bit signal for informing the buffer control circuit 23 that the output of the data signal DE from the external device is started and ended. Accordingly, the buffer control circuit 23 activates the control signal CNTL during a period, which is the delay time DT later than a period during which the CPU 1 outputs the control signal RD, i.e. from the time t1 to a time t7. As a result, the tri-state buffer 22 delays the value "Y" for the delay time DT behind the data signal DE, and outputs the same as the data signal DI.

Thus, the data signal DE outputted by the external device is inputted as the data signal DI to the CPU 1 with a delay for the delay time DT. This allows the CPU 1 to ensure a hold time corresponding to the delay time DT. The CPU 1 requiring a sufficiently long hold time for the data signal DE, therefore, can be built in the device 106. The device 106 is, in particular, advantageous when the same comprises a CPU 1 slow in an operation speed and low in a cost, and is connected with an up-dated external device fast in an operation speed.

While the invention has been shown and described in detail, the foregoing description is in all aspects illustrative and not restrictive. It is therefore understood that numerous modifications and variations can be devised without departing from the scope of the invention.

We claim:

1. A semiconductor device, comprising:
   a CPU operating in synchronization with an internal clock signal;
   a terminal, being exposed outside said semiconductor device so as to be connectable with a delay circuit which delays said internal clock signal for a predetermined delay time and thereby outputs a delayed signal as a delay clock signal, for receiving said delay clock; and
   a data transfer control circuit for relaying a data signal transferred between said CPU and an external device with a delay for said delay time according to said delay clock signal supplied through said terminal.

2. The semiconductor device of claim 1, wherein
   said semiconductor device, referring to said terminal as a first terminal, further comprises a second terminal, being exposed outside said semiconductor device so as to be connectable with said delay circuit, for supplying said internal clock signal to said delay circuit.

3. The semiconductor device of claim 1, further comprising
   a third terminal, being exposed outside said semiconductor device, for receiving a clock signal from an outside of said semiconductor device, wherein
   said clock signal received by said third terminal is transferred to said CPU as said internal clock signal.

4. The semiconductor device of claim 3, further comprising
   an internal clock signal generation circuit, being interposed between said third terminal and said CPU, for generating said internal clock signal according to said clock signal.

5. The semiconductor device of claim 1, wherein
   said data transfer control circuit comprises:
      a data hold circuit for holding said data signal, which is inputted to said data transfer control circuit, in synchronization with said delay clock signal;
      a buffer control circuit for outputting a first control signal, being active during a period delayed for said delay time behind a period during which said data signal is inputted, according to a second control signal, which said CPU outputs in synchronization with said internal clock to inform said buffer control circuit that a transfer of said data signal is started and ended, and to said delay clock signal; and
      a tri-state buffer for outputting said data signal held by said data hold circuit to an outside of said data transfer control circuit only when said first control signal is active.

6. The semiconductor device of claim 5, wherein
   said buffer control circuit comprises:
      an S/R flip-flop, having a set input and a reset input, for outputting said first control signal;
      a first logical AND circuit for transferring said delay clock signal to said set input only when said second control signal has a predetermined first value; and
      a second logical AND circuit for transferring said delay clock signal to said reset input only when said second control signal has a predetermined second value.

7. The semiconductor device of claim 5, wherein
   said data transfer control circuit further comprises a selection circuit, interposed between said buffer control circuit and said tri-state buffer, for selectively transferring either said first control signal or a third control signal which said CPU outputs to inform said external device that said data signal is transferred, to said tri-state buffer according to a selection signal.

8. The semiconductor device of claim 7, wherein
   said CPU has a register, and
   a signal held by said register is inputted to said selection circuit as a selection signal.

9. The semiconductor device of claim 1, further comprising
   a tri-state buffer for relaying another data signal transferred between said CPU and another external device, wherein
   said tri-state buffer passes said another data signal therethrough only when a control signal, which said CPU outputs to inform said another external device that said another data signal is transferred, is active.

10. The semiconductor device of claim 1, wherein
    said data signal relayed by said data transfer control circuit is transferred from said CPU to said external device.

11. The semiconductor device of claim 1, further comprising
    said delay circuit, wherein
    said delay circuit is connected with said terminal, and
    said delay time is set shorter than one cycle of said internal clock.

12. The semiconductor device of claim 11, wherein
    said delay circuit comprises:
       a first inverter for receiving said internal clock;
       a second inverter for outputting said delay clock; and
       a low-pass filter interposed between said first and second inverters having a capacitor and a resistor.

* * * * *